(12) United States Patent
Urabe

(10) Patent No.: US 7,431,405 B2
(45) Date of Patent: Oct. 7, 2008

(54) BICYCLE WHEEL HUB COVER

(75) Inventor: Hiroyuki Urabe, Sakai (JP)

(73) Assignee: Shimano Inc., Osaka (JP)

( * ) Notice: Subject to any disclaimer, the term of this patent is extended or adjusted under 35 U.S.C. 154(b) by 268 days.

(21) Appl. No.: 11/431,612

(22) Filed: May 11, 2006

(65) Prior Publication Data

US 2007/0024105 A1 Feb. 1, 2007

(30) Foreign Application Priority Data

Jul. 29, 2005 (JP) .............................. 2005-220734

(51) Int. Cl.
*B60B 7/00* (2006.01)
(52) U.S. Cl. .................... 301/110.5; 301/37.41; 301/59
(58) Field of Classification Search .............. 301/37.41, 301/59, 110.5, 110.6, 124.2
See application file for complete search history.

(56) References Cited

U.S. PATENT DOCUMENTS

| 1,567,638 | A |   | 12/1925 | Dean |  |
|---|---|---|---|---|---|
| 1,878,528 | A | * | 9/1932 | Kraeft | ........................ 301/60 |
| 3,170,549 | A |   | 2/1965 | Baker, III |  |
| 3,494,227 | A |   | 2/1970 | Shimano |  |
| 4,116,319 | A |   | 9/1978 | Nagano et al. |  |
| 4,145,095 | A |   | 3/1979 | Segawa |  |
| 4,226,317 | A |   | 10/1980 | Nagano et al. |  |
| 4,278,265 | A |   | 7/1981 | Nagano |  |
| 4,567,973 | A | * | 2/1986 | Butz | ........................... 192/64 |
| 4,593,799 | A |   | 6/1986 | Ozaki |  |
| 5,312,166 | A | * | 5/1994 | Nagano | ................... 301/110.5 |
| 5,492,392 | A | * | 2/1996 | Chen | ........................ 301/37.41 |
| 5,795,036 | A | * | 8/1998 | Campagnolo | ................. 301/59 |
| 6,004,240 | A |   | 12/1999 | Tabe |  |
| 6,309,028 | B1 | * | 10/2001 | Kanehisa et al. | ......... 301/110.5 |
| 6,380,731 | B1 |   | 4/2002 | Nishimoto |  |
| 6,401,895 | B1 | * | 6/2002 | Chen | ........................... 192/64 |
| 6,497,314 | B2 | * | 12/2002 | Kanehisa | ..................... 192/64 |
| 7,044,564 | B2 | * | 5/2006 | Chen | ....................... 301/110.5 |
| 2005/0067883 | A1 | * | 3/2005 | Meggiolan | ............... 301/110.5 |

FOREIGN PATENT DOCUMENTS

| DE | 35 23 358 A1 | 10/1986 |
| DE | 296 01 861 U1 | 4/1996 |
| GB | 573423 | 11/1945 |
| GB | 1 555 532 | 11/1979 |
| JP | 51-149548 U | 11/1976 |
| JP | 54-155251 U | 10/1979 |
| JP | 59-41916 U | 12/1984 |
| JP | 60-149484 U | 10/1985 |
| JP | 63-139092 U | 9/1988 |
| JP | 2563661 U | 11/1997 |
| JP | 2606244 | 8/2000 |

* cited by examiner

*Primary Examiner*—Russell D Stormer
(74) *Attorney, Agent, or Firm*—Global IP Counselors, LLP

(57) ABSTRACT

A hub cover is configured to be mounted to a wheel regardless of the spoke configuration of the wheel. The bicycle hub cover is capable of being attached to a bicycle hub that has a hub shell. The hub shell has a hub flange and a cap member. The hub cover comprises a cylindrical part, a retaining part, and a connecting part. The cylindrical part is capable of being attached to the cap member, which is mounted to the hub shell on the axially outward side of the hub flange. The retaining part is configured to latch onto the hub flange. The connecting part is configured to extend radially outward from the cylindrical part and connect the cylindrical part and the retaining part together.

11 Claims, 6 Drawing Sheets

BICYCLE WHEEL HUB COVER

This application claims priority under 35 U.S.C. § 119 to Japanese Patent Application No. 2005-220734. The entire disclosure of Japanese Patent Application No. 2005-220734 is hereby incorporated herein by reference.

BACKGROUND OF THE INVENTION

1. Field of the Invention

This invention generally relates to a bicycle hub cover. More specifically, the present invention relates to a bicycle hub cover configured and arranged to be attached to a hub of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

A bicycle hub is generally provided with a hub flange, and spokes are connected between the hub flange and the rim of a wheel. A known method of protecting the spokes from the chain of the bicycle is to install a spoke protector (one example of a hub cover) on the wheel (e.g., see Japanese Laid-Open Utility Model Publication No. 54-152451). The hub cover described in this Japanese Publication has a dish-like main body that contacts the spokes with an outer circumferential portion thereof and inner engaging parts that extend from the inner circumference of the main body to the axially inward facing surface of the hub flange. The inner engaging parts are arranged in three locations so as to be spaced apart along the circumferential direction and curved in such a fashion that they can engage with the inward surface of the hub flange when the axially inward facing surface of an outer circumferential portion of the main body is in contact with the spokes. Thus, the conventional hub cover is attached to the wheel by the inner engaging parts and the axially inward facing surface of the outer circumferential portion of the main body. The main body of the conventional hub cover is arranged in close proximity to the sprocket in order to prevent the chain from coming off the sprocket and prevent the chain from contacting the spokes.

The conventional hub cover described above is attached to the wheel in a manner that utilizes contact of the inward surface of an outer circumferential portion of the main body with the spokes. Consequently, there is the possibility that the conventional hub cover will be incompatible with some wheels (i.e., not attachable to some wheels) due to the configuration of the spokes. For example, since the degree of slant (i.e., slant angle) of the spokes varies depending on the internal diameter of the rim, there is the possibility that the hub cover will not match the slant angle of the spokes of some wheels. If the hub cover does not match the slant angle of the spokes, the inward surface of the outer circumferential portion of the main body might not contact the spokes or the inward surface might contact the spokes too strongly and exert unnecessary force against the spokes.

In view of the above, it will be apparent to those skilled in the art from this disclosure that there exists a need for an improved bicycle hub cover. This invention addresses this need in the art as well as other needs, which will become apparent to those skilled in the art from this disclosure.

SUMMARY OF THE INVENTION

One object of the present invention is to provide a hub cover that can be mounted to a wheel regardless of the spoke configuration of the wheel.

The foregoing objects can basically be attained by providing a bicycle hub cover in accordance with a first aspect of the present invention that is capable of being attached to a hub of a bicycle. The bicycle hub cover basically comprises a cylindrical part, a retaining part, and a connecting part. The cylindrical part is configured and arranged to be attached to a bicycle hub on an axially outward side of a hub flange of the hub. The retaining part is configured and arranged to engage with the hub flange. The connecting part is couples the cylindrical part and the retaining part together with the connecting part extending radially outward from the cylindrical part to the retaining part.

With this bicycle hub cover, in order to install the hub cover onto a wheel, the cylindrical part is mounted to the hub on the axially outward side of the hub flange and then the retaining part is engaged with the hub flange. This completes the installation of the hub cover to the wheel. When the hub cover has been installed, the connecting part that joins the cylindrical part and the engaging part together is arranged between the sprocket and the hub flange. With this hub cover, the hub cover is attached to the hub in a manner that utilizes the hub flange and the hub itself. Since the spoke configuration is irrelevant, the hub cover can be installed onto a wheel without regard for the spoke configuration.

A bicycle hub cover in accordance with a second aspect of the present invention is a bicycle hub cover according to the first aspect of the present invention, wherein the retaining part has a plurality of claw-like engaging parts that are spaced apart from one another in a circumferential direction and configured to engage with both faces of the hub flange. With this bicycle hub cover, the retaining part alone can hold the hub cover onto the hub flange and prevent the hub cover from becoming detached. As a result, there are no limitations on the shape of the cylindrical part so long as the cylindrical part can be mounted to the hub on the axially outward side of the hub flange.

A bicycle hub cover in accordance with a third aspect of the present invention is a bicycle hub cover according to the first aspect of the present invention, wherein the cylindrical part has a contact surface that is provided on one end face of the cylindrical part and configured to touch against an axially outward facing surface of the hub flange; and the retaining part has a plurality of claw-like engaging parts that are spaced apart from one another in a circumferential direction and configured to engage with the axially inward facing surface of the hub flange when the contact surface is touching against the axially outward facing surface of the hub flange. This bicycle hub cover is attached in such a fashion that the claw-like engaging parts engage with the axially inward facing surface of the hub flange while the contact surface of the cylindrical part touches against the axially outward facing surface of the hub flange. As a result, the hub cover is held at two locations and thus securely attached to the hub.

A bicycle hub cover in accordance with a fourth aspect of the present invention is a bicycle hub cover according to anyone of the first to third aspects of the present invention, wherein the connecting part is configured and arranged such that the connecting part faces in an axial direction towards tips of teeth of a sprocket that is mounted to the hub when the bicycle hub cover is installed on the hub. With this bicycle hub cover, since the chain and the connecting part are arranged across from each other relative to the axial direction, the chain will readily contact the connecting part if starts to come off the sprocket. Consequently, the bicycle hub cover serves to make it more difficult for the chain to come off the sprocket and more difficult for the chain to contact the spokes.

A bicycle hub cover in accordance with a fifth aspect of the present invention is a bicycle hub cover according to anyone of the first to fourth aspects of the present invention, wherein the connecting part is configured and arranged such that an axial distance will be formed between the connecting part and the tips of the teeth of the sprocket that is 6 mm or smaller when the bicycle hub cover is installed on the hub. With this bicycle hub cover, the gap between the connecting part and the sprocket is smaller than the maximum width dimension of the chain because the axial distance is 6 mm or smaller. As a result, it is more difficult for the chain to come off the sprocket.

A bicycle rear hub in accordance with a sixth aspect of the present invention comprises a hub axle, a driver, a hub shell, and a hub cover. The hub axle is configured and arranged to be fastened to a frame of a bicycle. The driver is mounted in a freely rotatable manner to the hub axle. The driver has an external circumferential sprocket mounting portion. The hub shell is connected to the driver and arranged around the outside circumference of the hub axle. The hub cover is configured such that it can be mounted on at least one end of the hub shell in a freely detachable and re-attachable manner. The bicycle hub cover basically comprises a cylindrical part, a retaining part, and a connecting part. The cylindrical part is configured and arranged to be attached to a bicycle hub on an axially outward side of a hub flange of the hub. The retaining part is configured and arranged to engage with the hub flange. The connecting part is couples the cylindrical part and the retaining part together with the connecting part extending radially outward from the cylindrical part to the retaining part.

With this bicycle rear hub, a hub cover in accordance with anyone of the first to fifth aspects of the present invention is attached to the hub shell. Since the hub cover is attached to the hub in a manner that utilizes the hub flange and the hub shell, the spoke configuration is irrelevant. As a result, the hub cover can be installed onto a wheel without regard for the spoke configuration.

With the present invention, the hub cover is attached to the hub utilizing the hub flange and the hub in such a fashion that the spoke configuration is irrelevant. As a result, the hub cover can be installed onto a wheel without regard for the spoke configuration.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
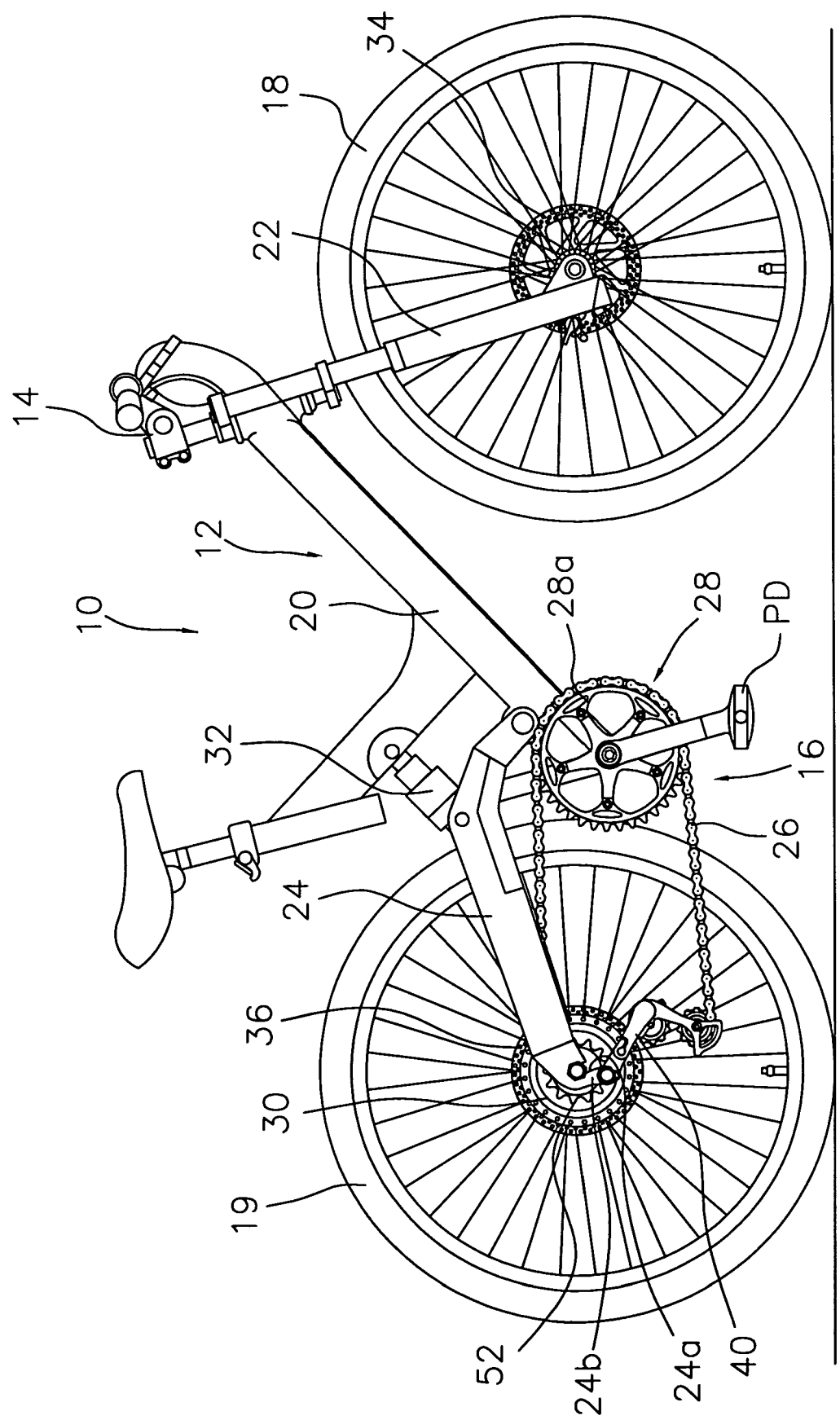
FIG. 1 is a side elevational view of a bicycle that is equipped with an internally geared hub in accordance with one embodiment of the present invention.

Referring initially to FIG. 1, a bicycle 10 is illustrated that is equipped in accordance with a first embodiment of the present invention. The bicycle 10 basically includes a frameset 12, a handlebar unit 14, a drive unit 16, a front wheel 18 and a rear wheel 19. The frameset 12 has a frame 20, a suspension fork 22, and a rear suspension or swing arm 24. The handlebar unit 14 is fastened to the suspension fork 22. The drive unit 16 basically includes a chain 26, a crankset 28, an internally geared rear hub 30, and other components. The crankset 28 includes a pair of pedals PD and a front sprocket 28a. The front wheel 18 is mounted to the suspension fork 22. The rear wheel 19 is mounted to the rear swing arm 24. The suspension fork 22 is mounted to a frontward portion of the frame 20 such that it can rotate freely about an axis that is slanted somewhat from the vertical direction. The rear swing arm 24 has a rear suspension 32 and is mounted to a rearward portion of the frame 20 in such a fashion that it can pivot freely. The rearward ends of the rear swing arm 24 are provides with a plurality of inverted-claw-shaped rear fork ends 24a for mounting the rear wheel 19, and a hanger tab 24b that extends downward from the bottom of each of the rear fork ends 24a.

As shown in FIG. 1, a front disk brake device 34 is mounted to the front wheel 18 and a rear disk brake device 36 is mounted to the rear wheel 19. The internally geared hub 30 is mounted to the rear wheel 19. A chain tensioner 40 is mounted to a hanger tab 24b of the rear swing arm 24 to apply tension to the chain 26.

Figure 2:
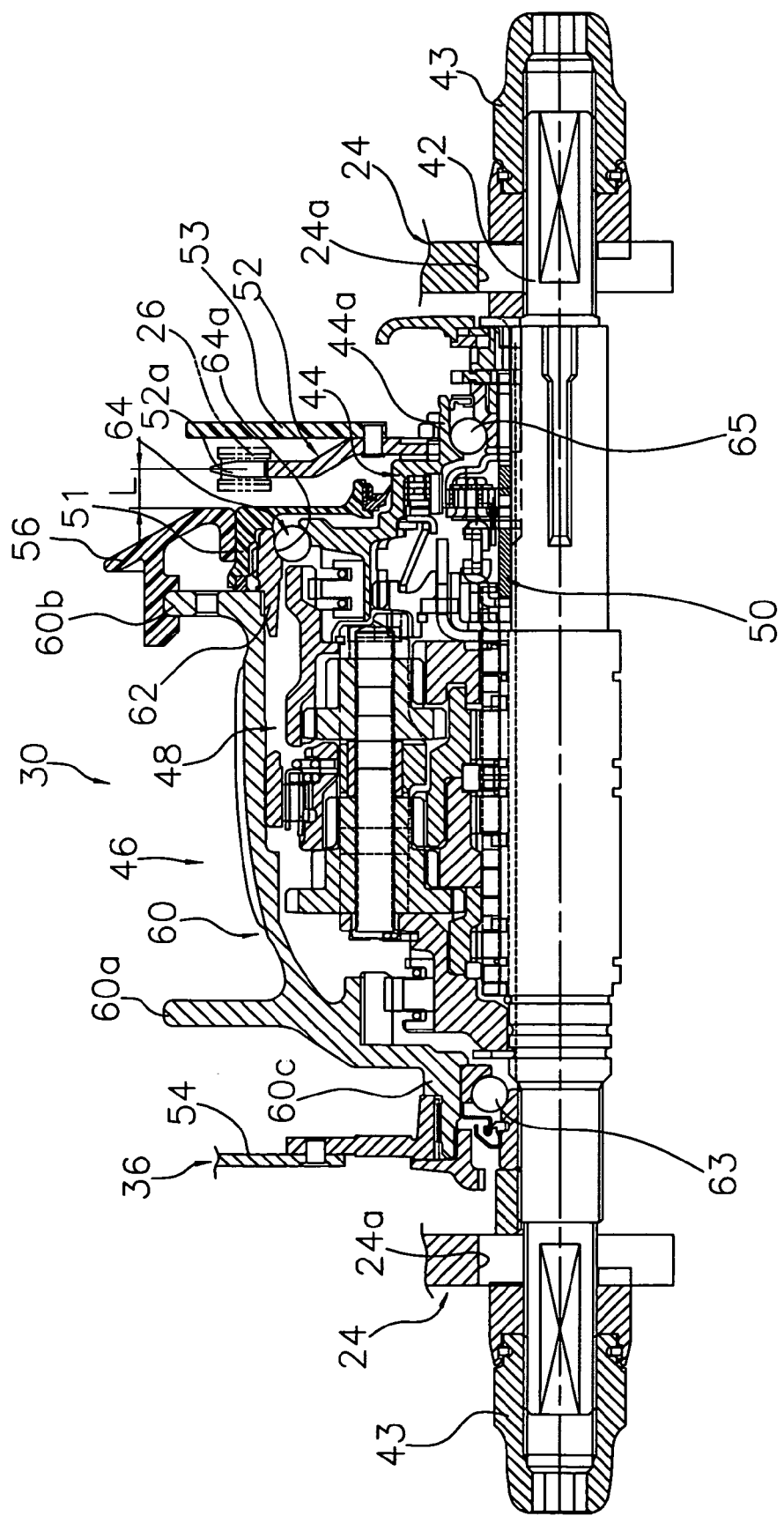
FIG. 2 is a cross sectional view of the internally geared hub of the bicycle illustrated in FIG. 1.

As shown in FIG. 2, the internally geared hub 30 basically includes a hub axle 42 of the rear wheel 19, a generally cylindrical driver 44, a generally cylindrical hub shell 46, a transmission mechanism 48, a gear changing mechanism 50 and a cover member 56 in accordance with an embodiment of the present invention. The hub axle 42 is capable of being fastened to the rear fork ends 24a of the rear swing arm 24. The generally cylindrical driver 44 is mounted on the hub axle 42 in such a fashion that it can rotate freely. The generally cylindrical hub shell 46 is arranged around the outside circumference of the hub axle 42. The transmission mechanism 48 has a planetary gear mechanism configured to transmit forward rotation of the driver 44 to the hub shell 46 through a plurality of power transmission paths. The gear changing mechanism 50 is configured to select one of the power transmission paths at a time. The cover member 56 in accordance with an embodiment of the present invention is attached to the external circumferential surface of the hub shell 46 at the other end of the hub shell (right end in FIG. 2).

The internally geared hub 30 serves as a rear gear changing device and has, for example, eight speeds, i.e., eight power transmission paths. Thus, the internally geared hub 30 can transmit the rotation of the crankset 28 (FIG. 1) to the hub shell 46 using anyone of eight different speeds (gear ratios). A disk rotor 54 for the rear disk brake device 36 is mounted on one end of the hub shell (left end in FIG. 2).

The hub axle 42 is fastened non-rotatably to the rear fork ends 24a with fastening nuts 43 that are screwed onto both ends of the hub axle 42. The driver 44 has a smaller diameter boss section 44a on one end thereof (right end in FIG. 2). The driver 44 is supported rotatably on the hub axle 42 by a bearing 65 installed in the boss section 44a. The rear sprocket 52 is attached non-rotatably to the driver 44. The hub shell 46 includes a shell body 60 and a cylindrical member 62. The shell body 60 has a pair (left-right) of hub flanges 60a and 60b. The cylindrical member 62 is connected non-rotatably to an internal circumferential surface of one end of the shell body 60 (right end in FIG. 2). The cap member 51 is attached to the external circumferential surface of the cylindrical member 62. The shell body 60 is generally cylindrical in shape. The shell body 60 has a smaller diameter boss section 60c on the other end (left end in FIG. 2) that is rotatably supported on the hub axle 42 by a bearing 63 installed in the boss section 60c. The disk rotor 54 is fastened non-rotatably to the boss section 60c.

Figure 3:
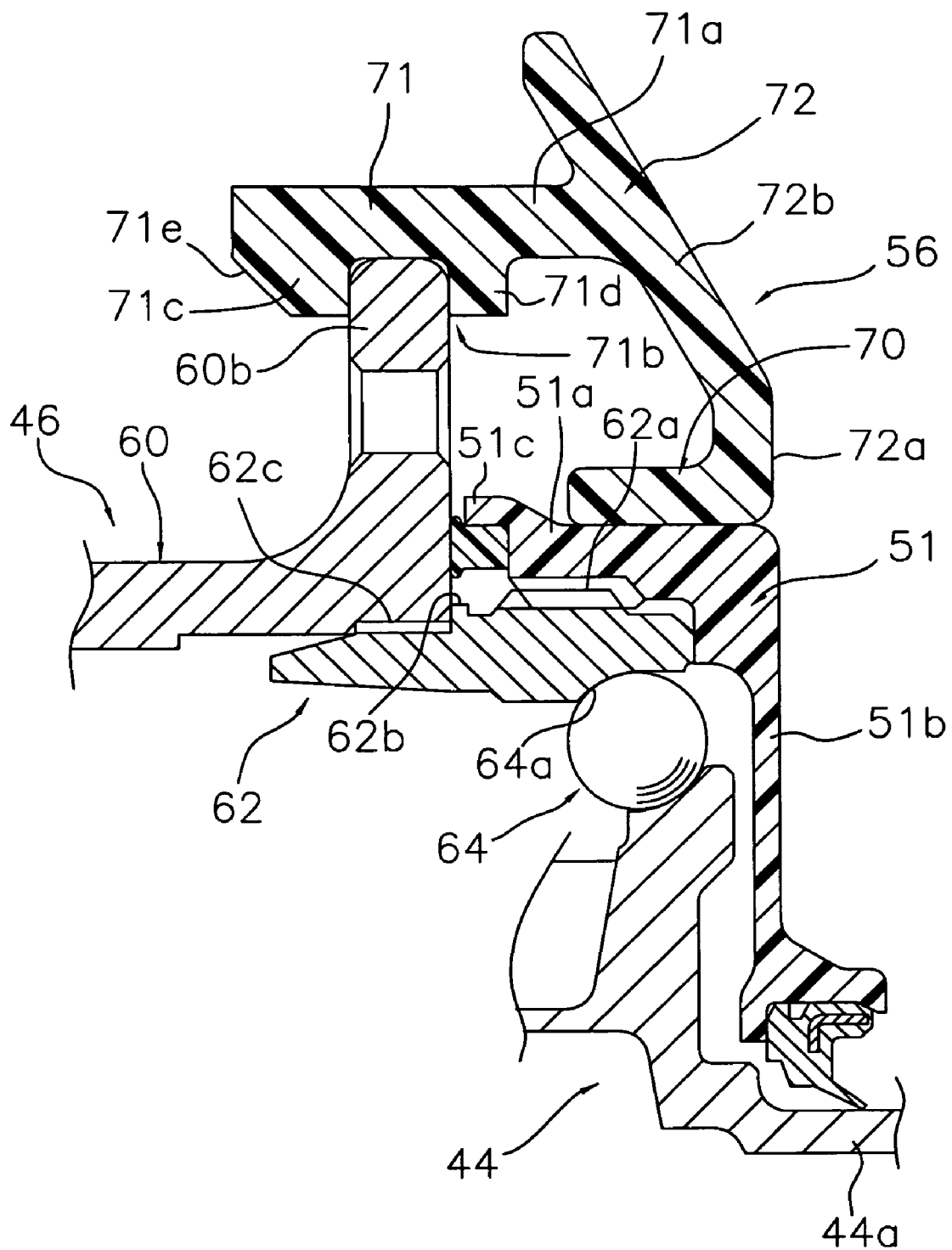
FIG. 3 is a partial cross sectional view of a portion of the internally geared hub where the hub cover is attached.

As shown in FIG. 3, a ball bearing surface 64a is formed on the internal circumference of the cylindrical member 62 and serves as a portion of a bearing 64 for supporting one end of the hub shell 46 in a freely rotatable fashion on the driver 44. An externally threaded section 62a and an annular protrusion 62b and serrations 62c that are arranged axially inward relative to the externally threaded section 62a are formed on the external circumference of the cylindrical member 62. The cap member 51 is screwed onto the externally threaded section 62a and thereby fastened in place. The one end of the shell body 60 touches against the annular protrusion 62b, thereby positioning the shell body 60 and the cylindrical member 62 relative to each other. The serrations 62c serve to fasten the cylindrical member 62 to the internal circumferential surface of the one end of the shell body 60.

The cap member 51 is a moisture-resistant seal serving to seal the gap between the driver 44 and the one end of the hub shell 46. The cap member 51 has an outer cylindrical part 51a configured to screw onto the external circumference of the cylindrical member 62 and a side wall part 51b configured to extend radially inward from the axially outward end of the outer cylindrical part 51a. A larger diameter part 51c is formed on a portion of the outer cylindrical part 51a that is arranged closely adjacent to the hub flange 60b.

Figure 4:
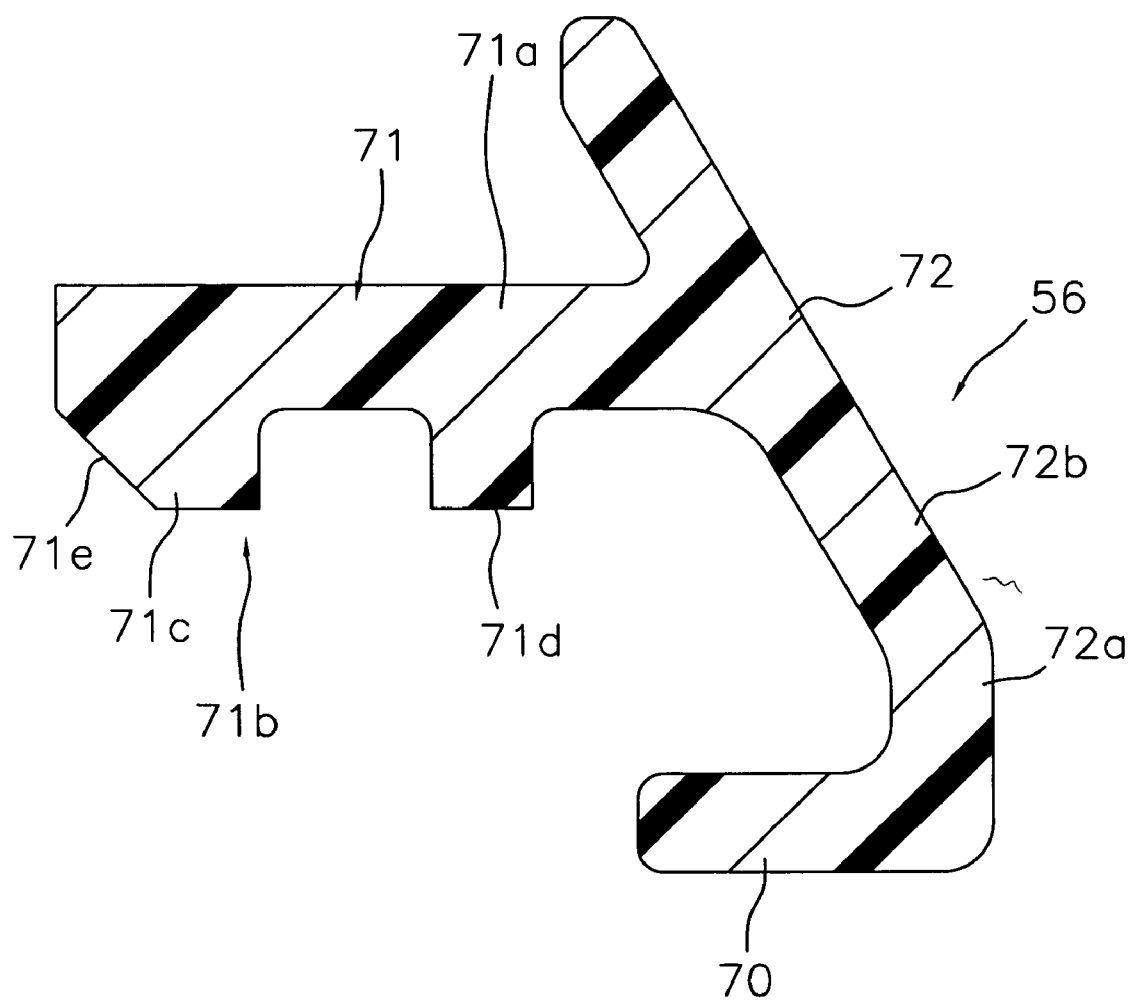
FIG. 4 is a cross sectional view of the hub cover in accordance with one embodiment of the present invention.
Figure 5:
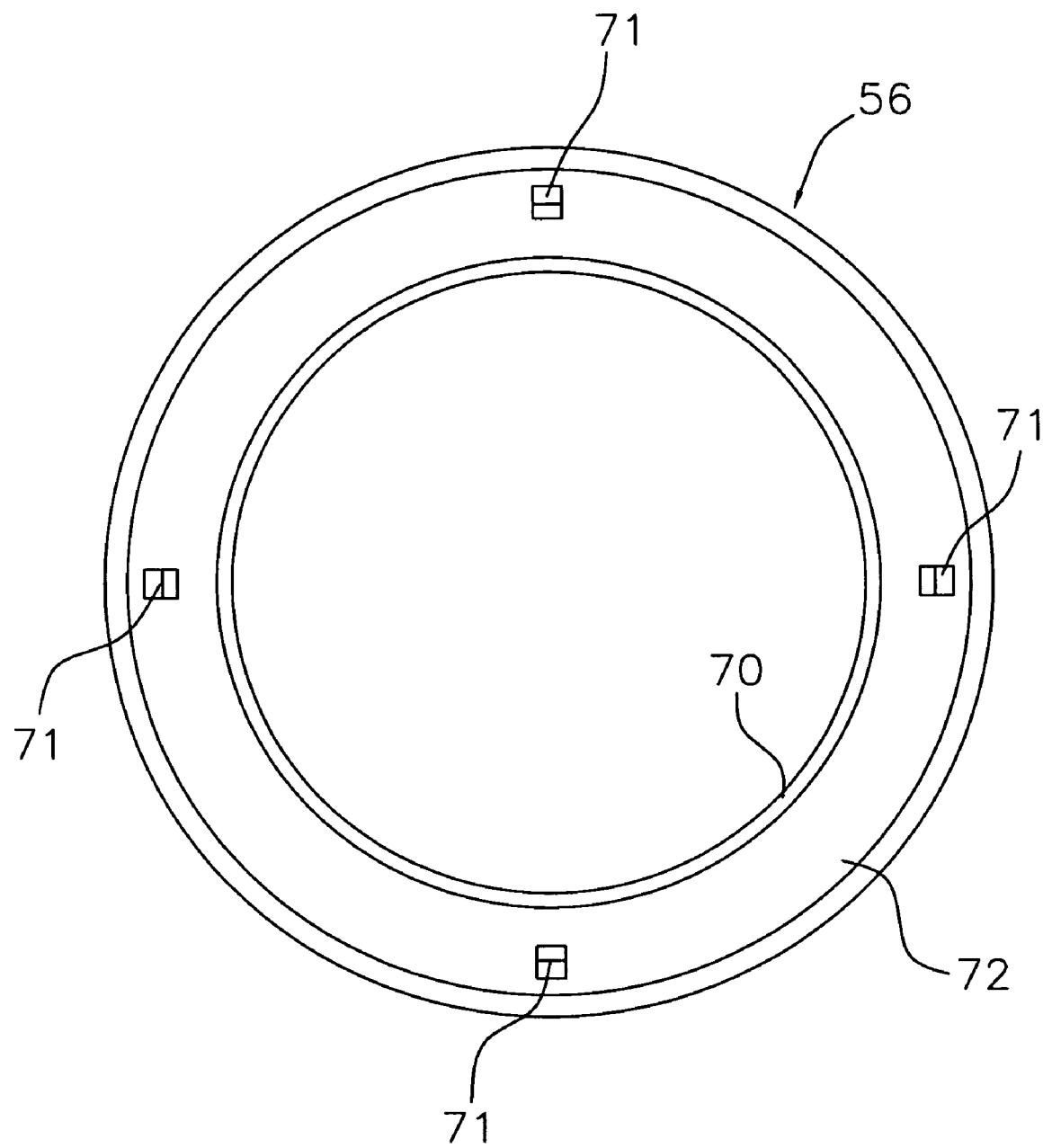
FIG. 5 is a side elevational view of the hub cover illustrated in FIG. 4 in accordance with one embodiment of the present invention.

The hub cover 56 in accordance with the present invention is made of, for example, a comparatively hard synthetic resin material, e.g., a methacrylic resin. As shown in FIGS. 3 to 5, the hub cover 56 basically includes a cylindrical part 70, a retaining part 71 and a connecting part 72. The cylindrical part 70, the retaining part 71 and the connecting part 72 are integrally formed as a one-piece, unitary member. The cylindrical part 70 is configured and arranged to be attached to the cap member 51, which constitutes a portion of the hub shell 46 located on the axially outward side of the hub flange 60b. The retaining part 71 is configured and arranged to engage the hub flange 60b. The connecting part 72 extends radially outward from the cylindrical part 70 to the retaining part 71. Thus, the connecting part 72 connects the cylindrical part 70 and the retaining part 71 together.

The cylindrical part 70 is a circular cylindrical portion configured to engage with the outer cylindrical part 51a of the cap member 51 and to extend from the axially outward face of the side wall part 51b of the cap member 51 toward the flange part 60b so as to reach a position slightly to the axially outward side of the larger diameter part 51c of the cap member 51.

In order to avoid interfering with the spokes, the retaining part 71 is formed as a plurality of retaining members (e.g., four) that arranged so as to be equally spaced apart from one another in a circumferential direction. Each of the retaining members of the retaining part 71 has an arm section 71a and a claw-like engaging section 71b. The arm section 71a is configured to extend axially inward from the connecting part 72. The claw-like engaging section 71b has a pair of engaging protrusions 71c and 71d formed on the radially inward facing surface of a tip end portion of the arm section 71a. The engaging protrusions 71c and 71d are configured to protrude in the radially inward direction, and arranged such that they can pinch the hub flange 60b therebetween. The size of the gap between the engaging protrusions 71c and 71d is substantially the same as the thickness dimension of the hub flange 60b. The amount by which each of the engaging protrusions 71c and 71d protrudes from the radially inward facing surface of the arm section 71a is 1 to 5 mm, preferably 1.5 mm to 3 mm. A tapered surface 71e configured such that the internal diameter thereof gradually increases as one moves axially inward toward the end face of the retaining part 71 is provided on the axially inward facing surface of the more axially inwardly located engaging protrusion 71c of each retaining member of the retaining part 71. The tapered surface 71e is provided to facilitate the opening up (spreading radially outward) of the tips of the retaining members of the retaining part 71 when the hub cover 56 is being installed. More specifically, in order to install the hub cover 56, the tapered surfaces 71e of the retaining members of the retaining part 71 are put in contact with the outer circumference of the hub flange 60b and the retaining members of the retaining part 71 are forced to spread open.

The connecting part 72 has a guard section 72a configured to extend radially outward in a direction perpendicular to the axial direction from the cylindrical part 70 and arranged such that the axially outward facing surface thereof is substantially coplanar with the axially outward facing surface of the side wall part 51b of the cap member 51. The connecting part 72 also has a tapered section 72b configured to extend radially outward and axially inward from the guard section 72a so as to assume a slanted (cone-like) form. The tapered section 72b is configured to extend beyond the arm sections 71a of the engaging parts in the radially outward direction. The guard section 72b is arranged in such a position as to face the portion of the chain 26 mounted on the tooth tip section 52a of the rear sprocket 52. The axial distance L (see FIG. 2) between the tooth tip section 52a and the guard section 72a is from 3 to 6 mm. As a result, the gap between the guard section 72a and the rear sprocket 52 is smaller than the maximum width dimension of the chain 26 and, thus, it is more difficult for the chain 26 to come off the rear sprocket 52.

The installation of this hub cover 56 onto the internally geared hub 30 of the rear wheel 19 will now be explained. First, the cylindrical part 70 is mounted onto the outer cylindrical part 51a of the cap member 51 and the hub cover 56 is moved axially inward until the tips of the arm sections 71a of the retaining members of the retaining part 71 touch against the hub flange 60b. Then, the connecting part 72 is pressed in the axially inward direction such that the tapered surfaces 71e of the arm sections 71a ride up on the outside edge of the hub flange 60b. The arm sections 71a will bend such that the tips of the arm sections 71a spread radially outward. When the axially inwardly positioned engaging protrusions 71c move beyond the axially inward facing surface of the hub flange

60b, the elasticity of the arm sections 71a cause the arm sections 71a to swing radially inwardly to their original positions and the hub flange 60b is pinched between the two engaging protrusions 71c and 71d of each claw-like engaging section 71b. The installation of the hub cover 56 is completed when the hub flange 60b is pinched between the engaging protrusions 71c and 71d of all of the retaining members of the retaining part 71 so that the retaining part 71 engages an outer peripheral surface of the hub flange 60b as shown in FIG. 3.

Since the hub cover 56 is attached to the hub in an elastically engaged state utilizing the hub flange 60b and the cap member 51 of the hub shell 46, the spoke configuration is irrelevant. As a result, the hub cover 56 can be installed onto the rear wheel 19 without regard for the spoke configuration and the chain 26 can be prevented falling off on the axially inward side of the rear sprocket 52. A chain guard 53 is provided on the axially outward side of the rear sprocket 26 to prevent the chain 26 from falling off on the outward side. The chain guard 53 is fastened to the rear sprocket 52.

Figure 6:
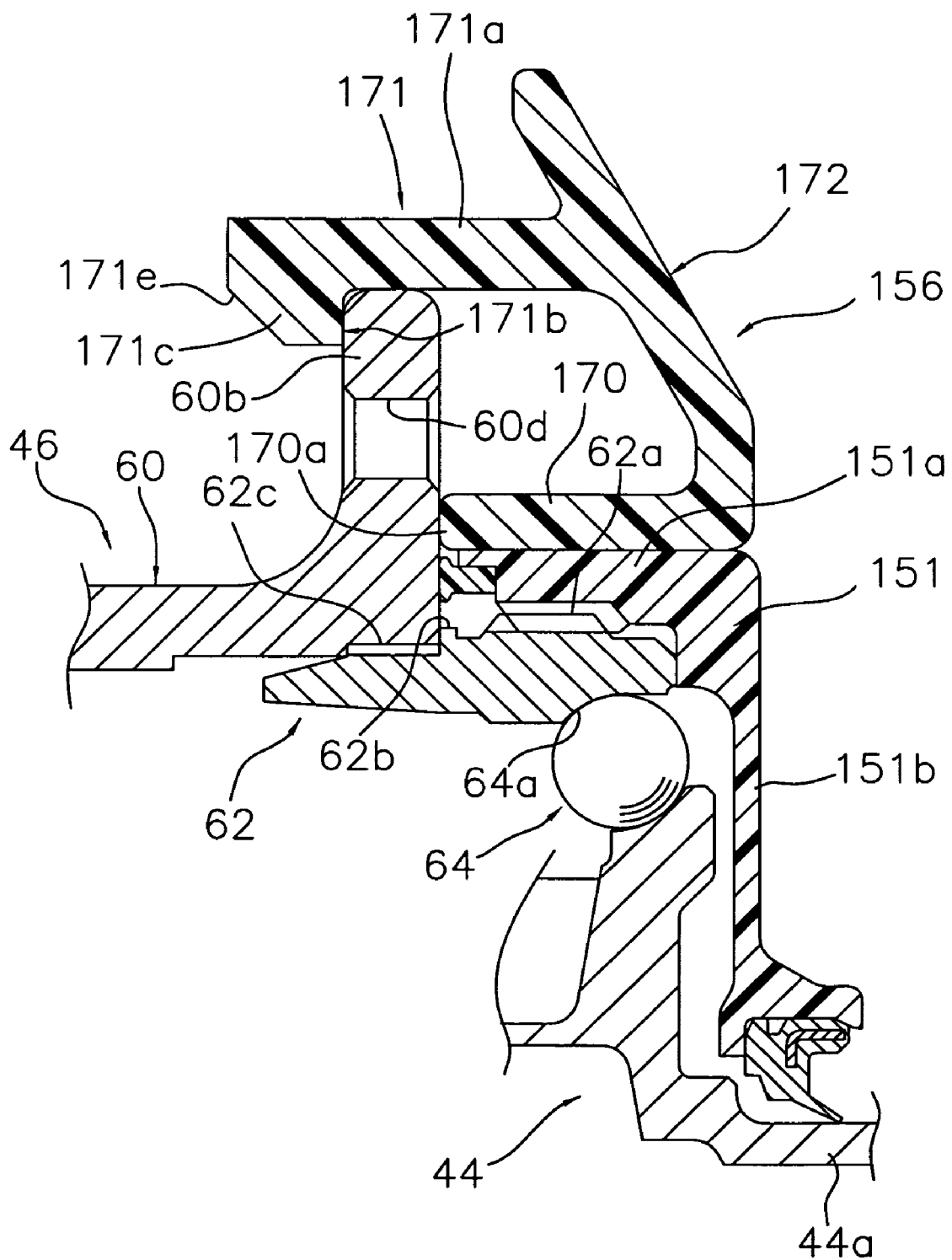
FIG. 6 is a partial cross sectional view, similar to FIG. 3, of the hub cover in accordance with another embodiment of the present invention.

Although in the previously described embodiment both faces of the hub flange 60b are pinched by the retaining members of the retaining part 71, the present invention is not limited to hub covers configured in such a fashion. For example, FIG. 6 shows another embodiment of a hub cover 156 that has a cylindrical part 170 configured to be mounted on the external circumferential surface of the outer cylindrical part 151a of a cap member 151, a retaining part 171, and a connecting part 172.

The cylindrical part 170 is a circular cylindrical portion configured to engage with the outer cylindrical part 151a of the cap member 151 and to extend to such a position that it contacts the flange part 60b. Therefore, a contact surface 170a configured to touch against the axially outward facing surface of the hub flange 60b is provided on the end face of the cylindrical part 170. Although the outer cylindrical part 151a of the cap member 151 shown in FIG. 6 does not have a larger diameter part, it is also acceptable if the outer cylindrical part 151a is provided with a larger diameter part. In either case, it is preferable for the outer circumferential surface of the cylindrical part 170 to be arranged further inward in the radial direction than the spoke engagement holes 60d so that the outer cylindrical part 170 will not interfere with the spokes when the spokes are installed into the spoke engaging holes 60d.

The retaining part 171 is a plurality of retaining members (e.g., four) arranged so as to be equally spaced apart from one another along a circumferential direction, similar to the retaining members of the retaining part 71 of FIG. 4. Each of the retaining members of the retaining part 171 has an arm section 171a configured to extend axially inward from the connecting part 172 and a claw-like engaging section 171b having an engaging protrusion 171c formed on the radially inward facing surface of a tip end portion of the arm section 171a. The engaging protrusions 171c are configured to protrude in the radially inward direction, and arranged such that they can engage with the axially inward facing surface the hub flange 60b. The engaging protrusions 171c are arranged and configured such that they latch onto the axially inward facing surface of the hub flange 60b when the contact surface 170a of the cylindrical part 170 touches against the hub flange 60b. The amount by which each of the engaging protrusions 171c protrudes from the radially inward facing surface of the arm section 171a is 1 to 5 mm, preferably 1.5 mm to 3 mm. A tapered surface 171e configured such that the internal diameter thereof gradually increases as one moves axially inward toward the end face of the retaining part 171 is provided on the axially inward facing surface of each engaging protrusion 171c. The tapered surface 171e is provided to facilitate the opening up (spreading radially outward) of the tips of the retaining members of the retaining part 171 when the hub cover 156 is being installed. More specifically, in order to install the hub cover 156, the tapered surfaces 171e of the retaining members of the retaining part 171 are put in contact with the outer circumference of the hub flange 60b and the retaining members of the retaining part 171 are forced to spread open. The connecting part 172 is the same as in the previous embodiment and an explanation thereof is omitted for the sake of brevity.

The installation of this hub cover 156 onto the internally geared hub 30 of the rear wheel 19 will now be explained. First, the cylindrical part 170 is mounted onto the outer cylindrical part 151a of the cap member 151 and the hub cover 156 is moved axially inward until the tips of the arm sections 171a of the retaining members of the retaining part 171 touch against the hub flange 60b. Then, the connecting part 172 is pressed in the axially inward direction such that the tapered surfaces 171e of the arm sections 171a ride up on the outside edge of the hub flange 60b. The arm sections 171a will bend such that the tips of the arm sections 171a spread radially outward. When the engaging protrusions 171c move beyond the axially inward facing surface of the hub flange 60b, the elasticity of the arm sections 171a cause the arm sections 171a to swing radially inwardly to their original positions and the engaging protrusions 171c of the claw-like engaging sections 171b latch onto the hub flange 60b. The installation of the hub cover 156 is completed when the hub flange 60b is latched onto by the protrusions 171c of all of the retaining members of the retaining part 171.

Since the hub cover 156 is attached to the hub in an elastically engaged state utilizing the hub flange 60b and the cap member 151 of the hub shell 46, the spoke configuration is irrelevant. As a result, the hub cover 156 can be installed onto the rear wheel 19 without regard for the spoke configuration and the chain 26 can be prevented falling off on the axially inward side of the rear sprocket 52.

Although in the previously described embodiments, the hub cover is attached to the cap member and not to the main body of the hub shell, it is acceptable for the hub cover to be attached directly to the shell body or the cylindrical member. It is also acceptable for the hub cover to be formed as an integral part of the cap member. In the latter case, it is preferable for the cap member to be attached to the hub shell by an elastic engagement instead of a screw threaded connection. Otherwise, the retaining part will interfere with (bump into) the spokes when the cap member is rotated in order to install it.

Although in the previously described embodiments, the connecting part is provided with a tapered section, it is acceptable omit the tapered section and let the connecting part comprise a guard section alone. Also while the previously described embodiment is provided with four retaining parts arranged along a circumferential direction, the number of retaining parts is not limited to four. Any number is acceptable so long as interference with the spokes can be avoided.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, although in the previously described embodiments of the present invention is applied to a hub cover for an internally geared hub serving as a rear hub of a bicycle, the present invention can be applied to a hub cover for any hub so long as the hub is a bicycle hub. Furthermore, the foregoing descriptions of the embodiments according to the present invention are provided for illustration only, and not for the purpose of limiting the invention as defined by the appended claims and their equivalents.

What is claimed is:

1. A bicycle hub cover comprising:
a cylindrical part configured and arranged to be attached to a bicycle hub on an axially outward side of a hub flange of the hub;
a retaining part configured and arranged to engage with the hub flange; and
a connecting part coupling the cylindrical part and the retaining part together with the connecting part extending radially outward from the cylindrical part to the retaining part,
the retaining part having a plurality of claw-like engaging parts that are spaced apart from one another in a circumferential direction and configured to engage a pair of opposite faces of the hub flange when the bicycle hub cover is installed on the hub flange.

2. The bicycle hub cover as recited in claim 1, wherein
the connecting part faces in an axial direction towards tips of teeth of a sprocket that is mounted to the hub when the bicycle hub cover is installed on the hub.

3. The bicycle hub cover as recited in claim 1, wherein
the connecting part is arranged such that an axial distance will be formed between the connecting part and the tips of the teeth of the sprocket that is 6 mm or smaller when the bicycle hub cover is installed on the hub.

4. A bicycle hub cover comprising:
a cylindrical part configured and arranged to be attached to a bicycle hub on an axially outward side of a hub flange of the hub;
a retaining part configured and arranged to engage with the hub flange; and
a connecting part coupling the cylindrical part and the retaining part together with the connecting part extending radially outward from the cylindrical part to the retaining part,
the cylindrical part having a contact surface that is provided on one end face of the cylindrical part and configured to touch against an axially outward facing surface of the hub flange; and
the retaining part having a plurality of claw-like engaging parts that are spaced apart from one another in a circumferential direction and configured to engage with the axially inward facing surface of the hub flange when the contact surface is touching against the axially outward facing surface of the hub flange.

5. The bicycle hub cover as recited in claim 4, wherein
the connecting part is configured and arranged such that the connecting part faces in an axial direction towards tips of teeth of a sprocket that is mounted to the hub when the bicycle hub cover is installed on the hub.

6. The bicycle hub cover as recited in claim 4, wherein
the connecting part is configured and arranged such that an axial distance will be formed between the connecting part and the tips of the teeth of the sprocket that is 6 mm or smaller when the bicycle hub cover is installed on the hub.

7. A bicycle rear hub comprising:
a hub axle configured and arranged to be fastened to a frame of a bicycle;
a driver mounted in a freely rotatable manner to the hub axle, the driver having an external circumferential sprocket mounting portion;
a hub shell connected to the driver and arranged around an outside circumference of the hub axle, the hub shell having at least one hub flange with a plurality of spoke openings; and
a hub cover mounted to one end of the hub shell in a freely detachable and re-attachable manner, the hub cover including
a cylindrical part attached on an axially outward side of the hub flange of the hub;
a retaining part engaged with an outer peripheral surface of the hub flange that is located radially outwardly of the spoke openings with respect to the hub axle; and
a connecting part coupling the cylindrical part and the retaining part together with the connecting part extending radially outward from the cylindrical part to the retaining part.

8. The bicycle rear hub as recited in claim 7, wherein
the connecting part faces in an axial direction towards tips of teeth of a sprocket that is mounted to the hub.

9. The bicycle rear hub as recited in claim 7, wherein
the connecting part is arranged such that an axial distance will be formed between the connecting part and the tips of the teeth of the sprocket that is 6 mm or smaller.

10. A bicycle rear hub
a hub axle configured and arranged to be fastened to a frame of a bicycle;
a driver mounted in a freely rotatable manner to the hub axle, the driver having an external circumferential sprocket mounting portion;
a hub shell connected to the driver and arranged around an outside circumference of the hub axle; and
a hub cover mounted to one end of the hub shell in a freely detachable and re-attachable manner, the hub cover including a cylindrical part attached on an axially outward side of a hub flange of the hub;

a retaining part engaged with the hub flange; and a connecting part coupling the cylindrical part and the retaining part together with the connecting part extending radially outward from the cylindrical part to the retaining part, the retaining part having a plurality of claw-like engaging parts that are spaced apart from one another in a circumferential direction and engaged with a pair of opposite faces of the hub flange.

11. A bicycle rear hub a hub axle configured and arranged to be fastened to a frame of a bicycle;

a driver mounted in a freely rotatable manner to the hub axle, the driver having an external circumferential sprocket mounting portion;

a hub shell connected to the driver and arranged around an outside circumference of the hub axle; and a hub cover mounted to one end of the hub shell in a freely detachable and re-attachable manner, the hub cover including a cylindrical part attached on an axially outward side of a hub flange of the hub;

a retaining part engaged with the hub flange; and a connecting part coupling the cylindrical part and the retaining part together with the connecting part extending radially outward from the cylindrical part to the retaining part, the cylindrical part having a contact surface that is provided on one end face of the cylindrical part and that touches against an axially outward facing surface of the hub flange; and the retaining part having a plurality of claw-like engaging parts that are spaced apart from one another in a circumferential direction and engaged with the axially inward facing surface of the hub flange when the contact surface is touching against the axially outward facing surface of the hub flange.

* * * * *